United States Patent
Liaw et al.

(10) Patent No.: US 10,135,075 B2
(45) Date of Patent: Nov. 20, 2018

(54) WATER-ACTIVATED POWER BANK STRUCTURE

(71) Applicants: Kuo Ming Liaw, Taipei (TW); Sung Nien Kao, Taipei (TW)

(72) Inventors: Kuo Ming Liaw, Taipei (TW); Sung Nien Kao, Taipei (TW)

( * ) Notice: Subject to any disclaimer, the term of this patent is extended or adjusted under 35 U.S.C. 154(b) by 479 days.

(21) Appl. No.: 14/870,896

(22) Filed: Sep. 30, 2015

(65) Prior Publication Data

US 2017/0092961 A1 Mar. 30, 2017

(51) Int. Cl.
| | |
|---|---|
| *H01M 6/32* | (2006.01) |
| *H01M 2/02* | (2006.01) |
| *H01M 2/04* | (2006.01) |
| *H01M 2/12* | (2006.01) |
| *H01M 4/06* | (2006.01) |
| *H01M 4/36* | (2006.01) |
| *H01M 4/38* | (2006.01) |
| *H01M 4/62* | (2006.01) |
| *H01M 4/74* | (2006.01) |
| *H01M 2/36* | (2006.01) |
| *H01M 4/02* | (2006.01) |
| *H01M 6/34* | (2006.01) |

(52) U.S. Cl.
CPC .............. *H01M 6/32* (2013.01); *H01M 2/022* (2013.01); *H01M 2/024* (2013.01); *H01M 2/043* (2013.01); *H01M 2/0404* (2013.01); *H01M 2/046* (2013.01); *H01M 2/0443* (2013.01); *H01M 2/0478* (2013.01); *H01M 2/1264* (2013.01); *H01M 2/367* (2013.01); *H01M 4/06* (2013.01); *H01M 4/364* (2013.01); *H01M 4/38* (2013.01); *H01M 4/381* (2013.01); *H01M 4/623* (2013.01); *H01M 4/625* (2013.01); *H01M 4/74* (2013.01); *H01M 6/34* (2013.01); *H01M 2004/027* (2013.01); *H01M 2004/028* (2013.01); *H01M 2300/0002* (2013.01)

(58) Field of Classification Search
None
See application file for complete search history.

(56) References Cited

U.S. PATENT DOCUMENTS

| | | | | |
|---|---|---|---|---|
| 4,005,246 A | * | 1/1977 | Schiffer | H01M 6/32 429/118 |
| 4,020,247 A | * | 4/1977 | Birt | H01M 4/60 429/119 |

(Continued)

*Primary Examiner* — Ula C Ruddock
*Assistant Examiner* — Tony S Chuo
(74) *Attorney, Agent, or Firm* — Hauptman Ham, LLP (57) ABSTRACT

A water-activated power bank structure, comprising: a bottle body with a top opening and a bottom opening, wherein the bottle body is configured to accommodate a first electrode structure and a second electrode structure. The water-activated power bank structure further comprises: a top cap configured to mate with the top opening of the bottle body; a first bottom cap configured to mate with the bottom opening of the bottle body; a second bottom cap configured to mate with the first bottom cap; and a power output module disposed in the second bottom cap; wherein the first electrode structure has a cylindrical shape and the second electrode structure has a mesh shape, and wherein the power output module is electrically connected to the first electrode structure and the second electrode structure.

20 Claims, 5 Drawing Sheets

(56) References Cited

U.S. PATENT DOCUMENTS

| | | | | |
|---|---|---|---|---|
| 4,806,439 A | * | 2/1989 | Wessling | H01M 2/1653 |
| | | | | 429/118 |
| 2013/0029215 A1 | * | 1/2013 | Signorelli | H01G 11/78 |
| | | | | 429/179 |

* cited by examiner

WATER-ACTIVATED POWER BANK STRUCTURE

TECHNICAL FIELD

The present disclosure generally relates to a power generating device. More specifically, the present disclosure relates to a water-activated power bank structure.

BACKGROUND

Consumer batteries available on the market, such as button cell batteries and zinc-carbon batteries, are generally called primary cells. These batteries are designed to be used once and then discarded. However, heavy metals and electrolytes contained in the primary cells are harmful to the environment, resulting in environmental pollution when they are discarded. For example, if the electrolytes contained in the primary cells leak out, this may cause a chemical reaction with water, which then produces toxic substances.

In recent years, research for alternatives to traditional primary cells has made significant progress. A water-activated power generating device, which is generally known as a water battery, is an alternative to the traditional primary cells. A water battery is a battery that does not contain toxic electrolytes and is designed to produce no voltage until it is soaked in or filled with water. Therefore, in comparison with the traditional primary cells, water batteries can be easily stored since no chemical reaction will occur as long as they are not in contact with water. Furthermore, materials used for manufacturing water batteries are environmentally friendly, which means that when a water battery is discarded, the components of the water battery can be easily recycled and do not produce toxic substances.

However, existing water batteries have some disadvantages. For example, the life time of existing water batteries depends on whether the electrode materials of the batteries can be completely consumed during the chemical reaction between the electrode materials. The electrodes of existing water batteries are not designed to have an optimal exposure area for reaction. Furthermore, the used electrode materials of existing water batteries cannot be easily replaced with new electrode materials. Therefore, there is a need to develop a water-activated power generating device that overcomes the disadvantages mentioned above.

SUMMARY

The devices disclosed herein each have several aspects, no single one of which is solely responsible for its desirable attributes. Without limiting the scope as expressed by the claims that follow, the more prominent features of certain embodiments of the present disclosure will now be discussed briefly. After considering this discussion, and particularly after reading the section entitled "Detailed Description of Certain Embodiments," one will understand how the features of the present disclosure provide several advantages over other water batteries.

The embodiments of the present disclosure provide a water-activated power bank structure, comprising: a bottle body with a top opening and a bottom opening, wherein the bottle body is configured to accommodate a first electrode structure and a second electrode structure. The water-activated power bank structure further comprises: a top cap configured to mate with the top opening of the bottle body; a first bottom cap configured to mate with the bottom opening of the bottle body; a second bottom cap configured to mate with the first bottom cap; and a power output module disposed in the second bottom cap. The first electrode structure has a cylinder shape and the second electrode structure has a mesh shape, and the power output module is electrically connected to the first electrode structure and the second electrode structure.

In an embodiment, the top cap comprises: a first silicon slice; a second silicon slice; and an air vent disposed on the top of the top cap. An opening is formed in the center of the first silicon slice and a cut is formed in the center of the second silicon slice, wherein the thickness of the first silicon slice is greater than the thickness of the second silicon slice, and wherein the opening and the cut are configured such that gas, but not liquid, can pass through the cut.

In another embodiment, the water-activated power bank structure further comprises: a first conductive component disposed on the inner sidewall of the bottle body; a second conductive component disposed on both the inner sidewall and the outer sidewall of the first bottom cap; and a third conductive component disposed on the inner sidewall of the second bottom cap. The first conductive component is in contact with the second conductive component when the first bottom cap mates with the bottom opening of the bottle body, and the second conductive component is in contact with the third conductive component when the second bottom cap mates with the first bottom cap.

In another embodiment, the water-activated power bank structure further comprises a mounting plate having a silicon O-ring, an ACRYLONITRILE-BUTADIENE-STYRENE (ABS) resin, and a conductive plate. The mounting plate is fixed to the first electrode structure via a fixing component. The silicon O-ring is configured to prevent liquid from leaking out from the bottom opening of the bottle body, and the fixing component is made of conductive materials and is processed to be rust resistant.

In another embodiment, the water-activated power bank structure further comprises a retractable component disposed in a cavity. The retractable component is made of conductive materials is in contact with a base, the conductive plate, and/or the fixing component when the first bottom cap mates with the bottom opening of the bottle body and when the second bottom cap mates with the first bottom cap.

DETAILED DESCRIPTION OF CERTAIN EMBODIMENTS

The following detailed description is directed to specific embodiments of the present disclosure. However, the present disclosure can be implemented in many different ways. In this description, reference is made to the accompanying drawings, wherein corresponding parts are identified by numerals throughout all drawings.

Figure 1:
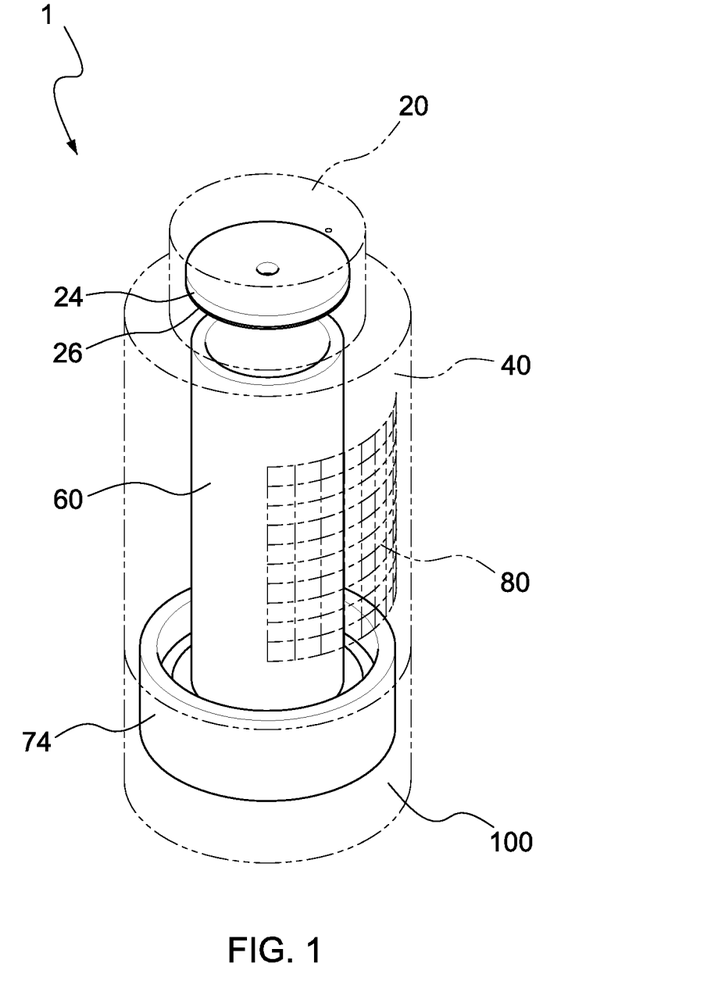
FIG. 1 is a three-dimensional view of a water-activated power bank structure, according to an embodiment of the present disclosure.

FIG. 1 is a three-dimensional view of a water-activated power bank structure, according to an embodiment of the present disclosure. Please note that the components shown in FIG. 1 are not drawn to scale and are solely for illustrative purposes. As shown in FIG. 1, the water-activated power bank structure 1 comprises a top cap 20, a bottle body 40, a first electrode structure 60, a second electrode structure 80, a first bottom cap 74 and a second bottom cap 100. The top cap 20 comprises a first silicon slice 24 and a second silicon slice 26. The first electrode structure 60 is disposed within the bottle body 40 and is fixed by the first bottom cap 74 and the second bottom cap 100. The second electrode structure 80 is disposed on the inner sidewall of the bottle body 40.

Figure 2A:
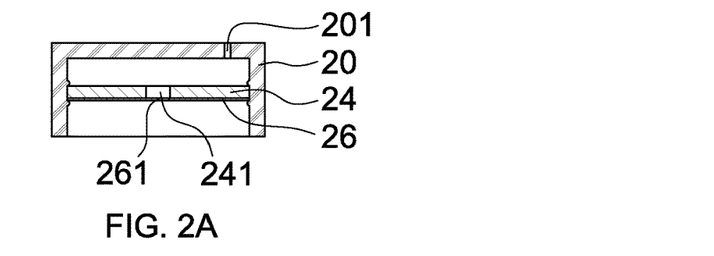
FIG. 2A is a schematic view of a top cap 20 of a water-activated power bank structure, according to an embodiment of the present disclosure.

FIG. 2A is a schematic view of a top cap 20 of a water-activated power bank structure, according to an embodiment of the present disclosure. Please note that the components shown in FIG. 2A are not drawn to scale and are solely for illustrative purposes. As shown in FIG. 2A, an air vent 201 is disposed on the top cap 20. The first silicon slice 24 is thicker than the second slice 26. An opening 241 is formed in the center of the first silicon slice 24, and a cut 261 is formed in the center of the second silicon slice 26. The first silicon slice 24 and the second silicon slice 26 are fixed on the inner sidewall of the top cap 20. The opening 241 and the cut 261 are configured such that air and gas, not liquid, can pass through the opening 241 and the cut 261. Therefore, the gas produced during the chemical reaction between the electrode materials can be exhausted through the opening 241, the cut 261 and the air vent 201. On the other hand, the top cap 20 can prevent the liquid inside the bottle body 40 from leaking out.

Figure 2B:
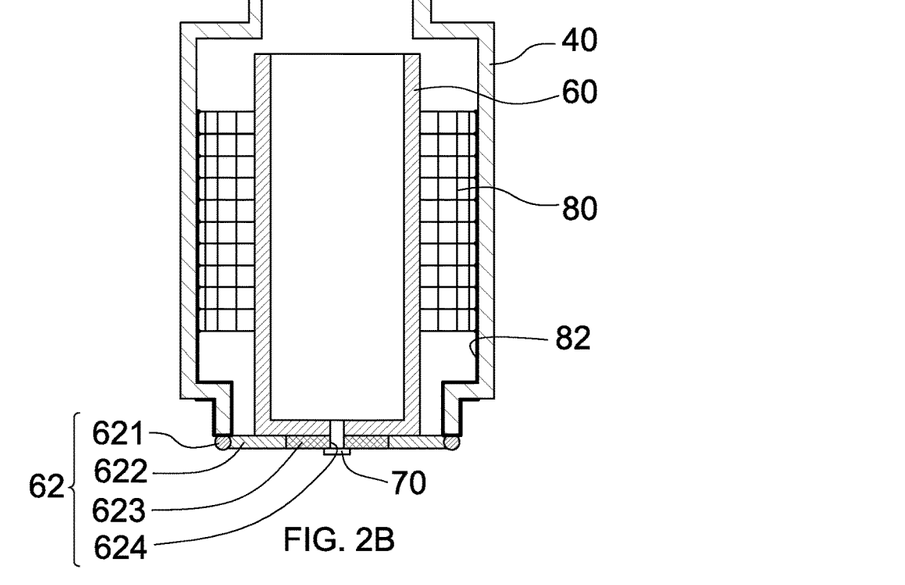
FIG. 2B is a schematic view of a bottle body 40 of a water-activated power bank structure, according to an embodiment of the present disclosure.

FIG. 2B is a schematic view of a bottle body 40 of a water-activated power bank structure, according to an embodiment of the present disclosure. Please note that the components shown in FIG. 2B are not drawn to scale and are solely for illustrative purposes. The bottle body 40 has a cylindrical shape with two openings respectively on the top and the bottom of the bottle body 40. A second electrode structure 80 is disposed on the inner sidewall of the bottle body 40. The second electrode structure 80 has a mesh shape.

In an embodiment, the second electrode structure 80 comprises carbon (C), nickel (Ni) and conductive meshes. In another embodiment, the second electrode structure 80 may comprise at least one of the following materials: polytetrafluoroethylene (PTFE), super-conductive carbon black, graphite, and an electrically conductive mesh. The above-mentioned materials enable the second electrode structure 80 to produce more complete chemical reactions, which increases the life of the water-activated power bank structure.

In an embodiment, the shape of the second electrode structure 80 is flexible due to the conductive meshes within the second electrode structure 80. Because of its flexibility, the second electrode structure 80 can be placed in full contact with the inner sidewall of the bottle body 40. In another embodiment, the second electrode structure 80 extends for only a part of the surface of the inner sidewall of the bottle body 40. In another embodiment, the second electrode structure 80 extends for the whole surface of the inner sidewall of the bottle body 40. Compared with existing electrode structures, the flexibility of the second electrode structure 80 enables the second electrode structure 80 to have a greater exposure area without the need to increase its size as explained in detail below.

A first conductive component 82 is disposed on the inner sidewall of the bottle body 40. The first conductive component 82 is configured to be electrically connected to the second electrode structure 80. In an embodiment, the first conductive component 82 is a thin metal plate disposed on the inner sidewall of the bottle body 40. In another embodiment, the first conductive component 82 is a conductive coating disposed on the inner sidewall of the bottle body 40 by a plating process. As shown in FIG. 2B, the first conductive component 82 extends to the bottom of the bottle body 40 and covers both the inner sidewall and the outer sidewall of the bottom opening of the bottle body 40.

The first electrode structure 60 has a cylindrical shape with an opening on the top of the first electrode structure 60. The first electrode structure 60 may be, but is not limited to, a magnesium (Mg) electrode structure 60. A mounting plate 62 is fixed to the first electrode structure 60 via a fixing component 70. The mounting plate 62 comprises a silicon O-ring 621, an ACRYLONITRILE-BUTADIENE-STYRENE (ABS) resin 622 and a conductive plate 623. A hole 624 is formed in the center of the conductive plate 623 for the fixing component 70 to go through.

The fixing component 70 is made of conductive materials. The Mg electrode structure 60 is consumed as the water-activated power bank structure generates power. Due to the highly reactive properties of Mg, the fixing component 70 is likely to be corroded. In order to extend the life of the water-activated power bank structure, the fixing component is processed to be rust resistant. In an embodiment, the fixing component 70 is a rivet and is processed to be rust resistant. In another embodiment, the fixing component 70 is a screw and is processed to be rust resistant.

After water is poured into the bottle body 40, the silicon O-ring 621 can prevent water from leaking out from the bottom opening of the bottle body 40. The conductive plate 623 is in close contact with the bottom of the first electrode structure 60 via the fixing component 70. Therefore, the conductive plate 623 is electrically connected to the first electrode structure 60.

Figure 2C:
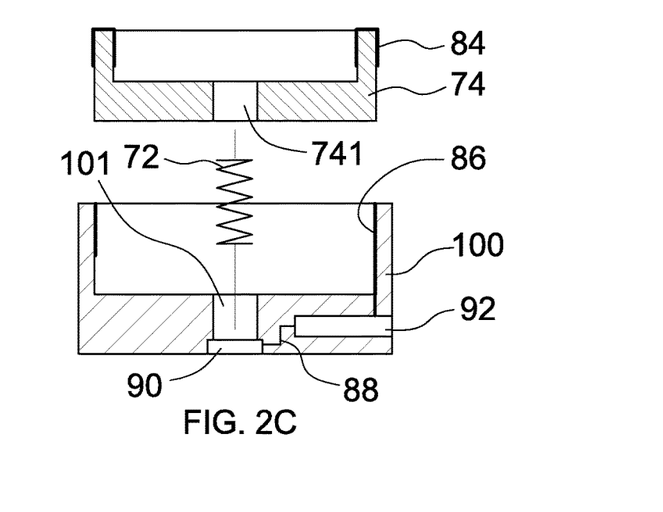
FIG. 2C is a schematic view of a first bottom cap 74 and a second bottom cap 100 of a water-activated power bank structure, according to an embodiment of the present disclosure.

FIG. 2C is a schematic view of a first bottom cap 74 and a second bottom cap 100 of a water-activated power bank structure, according to an embodiment of the present disclosure. Please note that the components shown in FIG. 2C are not drawn to scale and are solely for illustrative purposes. An opening 741 is formed in the center of the first bottom cap 74. A second conductive component 84 is disposed on both the inner sidewall and the outer sidewall of the first bottom cap 74. In an embodiment, the second conductive component 84 is a thin metal plate. In another embodiment, the second conductive component 84 is a conductive coating disposed using a plating process.

A base 90 is disposed at the bottom of the second bottom cap 100 and a cavity 101 is formed above the base 90. The base 90 is made of conductive materials. A third conductive component 86 is disposed on the inner sidewall of the second bottom cap 100. In an embodiment, the third conductive component 86 is a thin metal plate. In another embodiment, the third conductive component 86 is a conductive coating disposed using a plating process. A retractable component 72, such as a spring, made of conductive materials is disposed in a cavity 101.

The second bottom cap 100 further comprises a power output module 92. The power output module 92 is electrically connected to the base 90 via a connection component 88. Furthermore, the power output module 92 is electrically connected to the third conductive component 86. The power output module 92 is configured to output a direct-current (DC) current when a load is connected to the power output module 92. In an embodiment, the power output module 92 can be a universal serial bus (USB) port.

Figure 3:
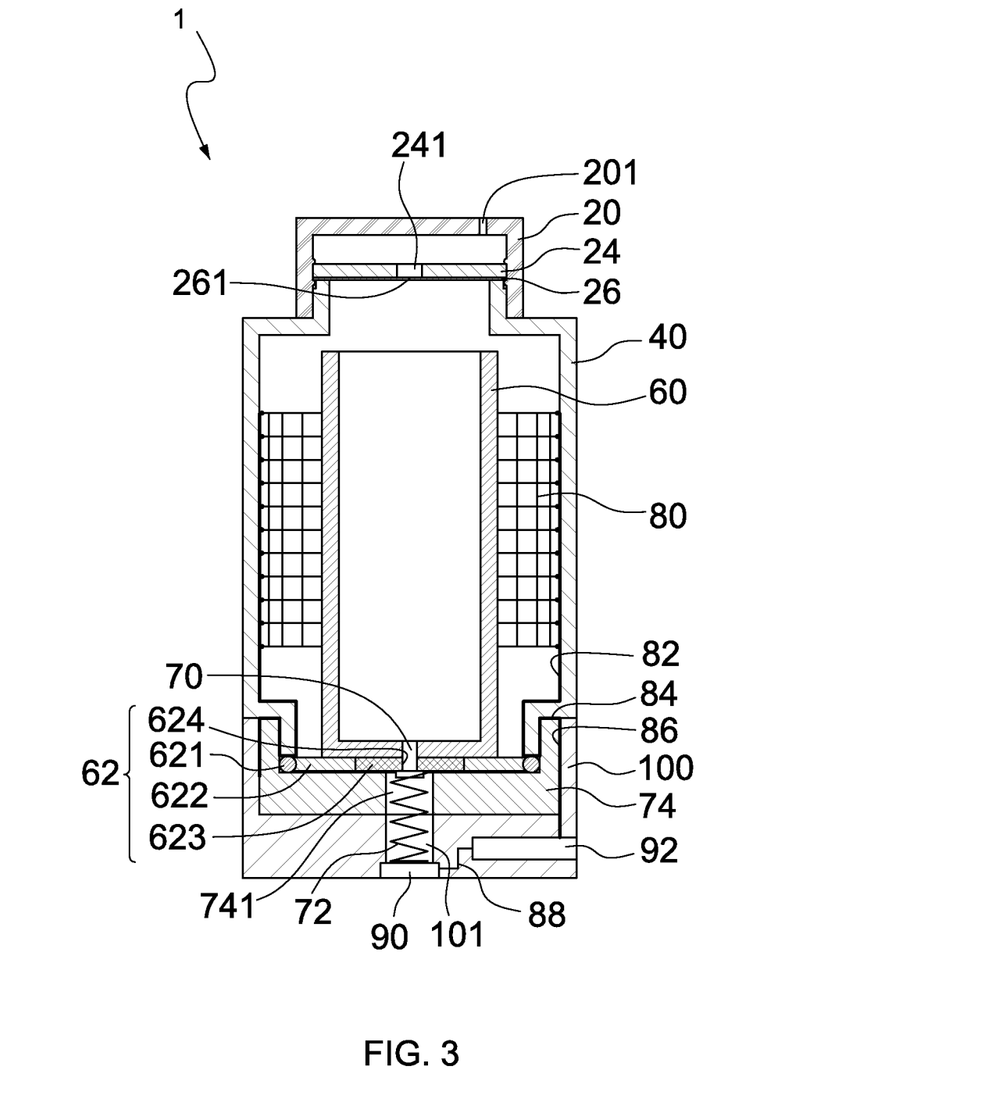
FIG. 3 is a schematic view of a water-activated power bank structure, according to an embodiment of the present disclosure.

FIG. 3 is a schematic view of a water-activated power bank structure, according to an embodiment of the present disclosure. Please note that the components shown in FIG. 3 are not drawn to scale and are solely for illustrative purposes. As shown in FIG. 3, the top cap 20 is configured to mate with the top opening of the bottle body 40. In an embodiment, the top cap 20 may mate with the top opening of the bottle body 40 via screw threads (not shown). In another embodiment, the top cap 20 may mate with the top opening of the bottle body 40 in a snap-in manner.

The first bottom cap 74 is configured to mate with the bottom opening of the bottle body 40. The second bottom cap 100 is configured to mate with the first bottom cap 74. In an embodiment, the first bottom cap 74 may mate with the bottom opening of the bottle body 40 via screw threads (not shown). In another embodiment, the first bottom cap 74 may mate with the bottom opening of the bottle body 40 in a snap-in manner. In another embodiment, the second bottom cap 100 may mate with the first bottom cap 74 via screw threads (not shown). In another embodiment, the second bottom cap 100 may mate with the first bottom cap 74 in a snap-in manner.

When the first bottom cap 74 mates with the bottom opening of the bottle body 40, the first conductive component 82 is in contact with the second conductive component 84. When the second bottom cap 100 mates with the first bottom cap 74, the second conductive component 84 is in contact with the third conductive component 86. Disposing the conductive components on the sidewalls of bottle body 40, the first bottom cap 74 and the second bottom cap 100 ensures good contact between the first conductive component 82, the second conductive component 84 and the third conductive component 86. As a result, the power output module 92 is electrically connected to the second electrode structure 80 via the first conductive component 82, the second conductive component 84 and the third conductive component 86.

Furthermore, when the first bottom cap 74 mates with the bottom opening of the bottle body 40 and when the second bottom cap 100 mates with the first bottom cap 74, the retractable component 72 is in contact with the base 90, the conductive plate 623 and/or the fixing component 70. Therefore, the power output module 92 is electrically connected to the first electrode structure 60 via the connection component 88, the base 90, the retractable component 72, the conductive plate 623, and/or the fixing component 70.

Figure 4:
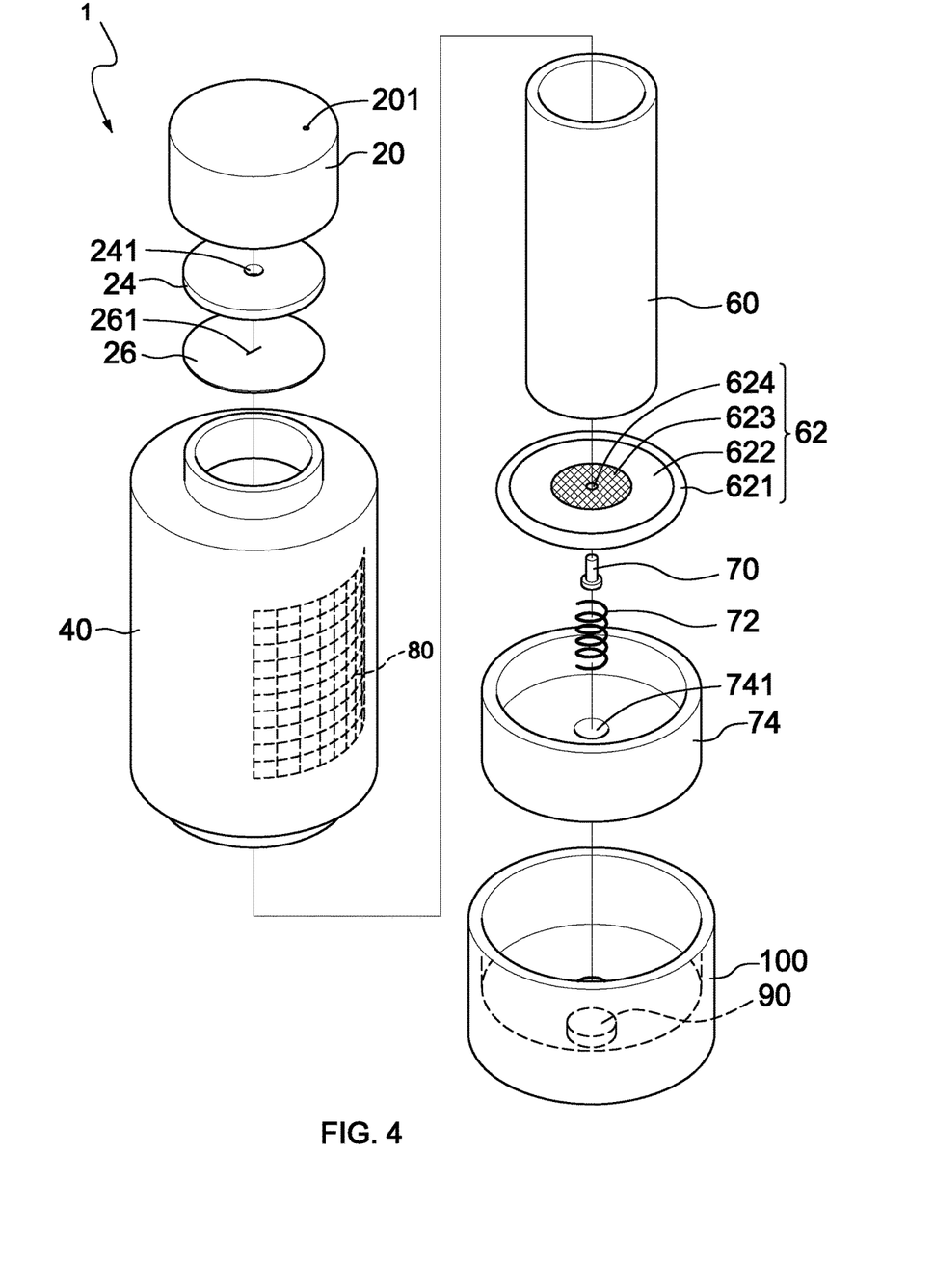
FIG. 4 is an exploded drawing of a water-activated power bank structure, according to an embodiment of the present disclosure.

FIG. 4 is an exploded drawing of a water-activated power bank structure, according to an embodiment of the present disclosure. Please note that the components shown in FIG. 4 are not drawn to scale and are solely for illustrative purposes. The water-activated power bank structure is designed such that water is to be poured into the bottle body 40 from the top opening of the bottle body 40. The first electrode structure 60, together with the mounting plate 62, is inserted into the bottle body 40 from the bottom opening of the bottle body 40. According to the design of the present disclosure, a user can easily replace a used electrode structure 60 with a new electrode structure 60.

The first electrode structure 60 has a cylindrical shape. Compared with existing water batteries that usually use a solid Mg pillar, the first electrode structure 60 with a cylindrical shape can provide a bigger exposure area than a conventional solid Mg pillar. As a result, the water-activated power bank structure of the present disclosure can produce more complete chemical reactions, which can in turn increase the life of the water-activated power bank structure.

Although the second electrode structure 80 shown in FIGS. 1 and 4 only extends for a part of the inner sidewall of the bottle body 40, it should be understood that the area covered by the second electrode structure 80 can be extended according to different designs. The larger the area of the second electrode structure 80, the longer the life of the water-activated power bank structure.

Figure 5:
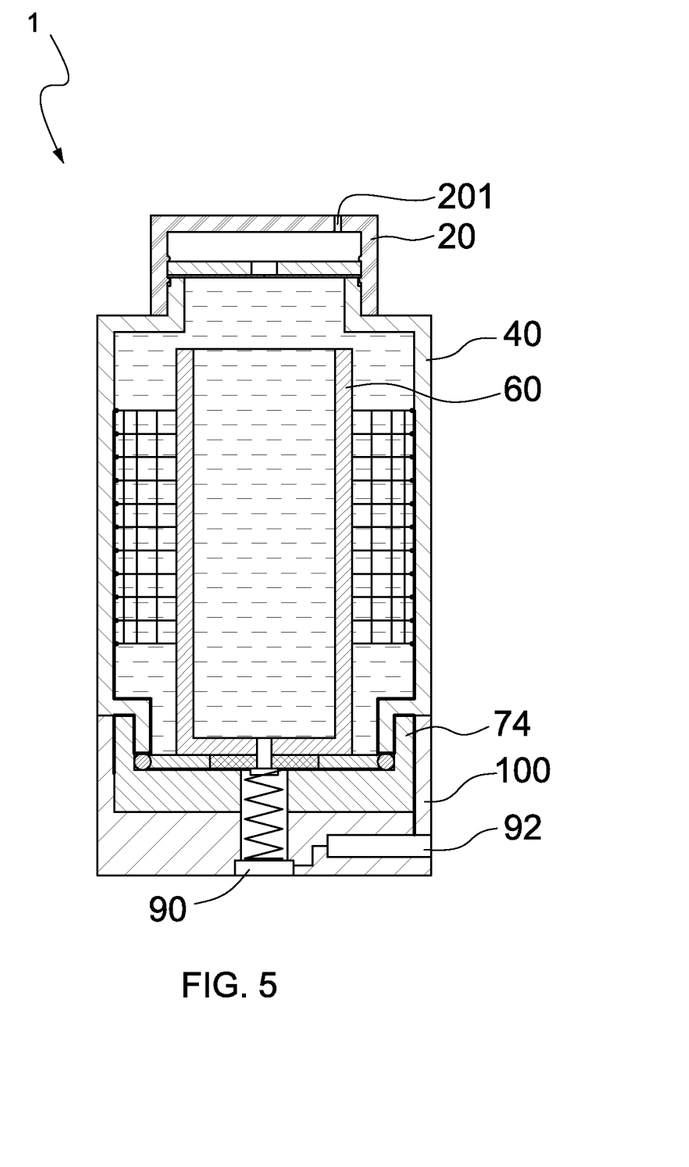
FIG. 5 is a schematic view of a water-activated power bank structure, according to an embodiment of the present disclosure.

FIG. 5 is a schematic view of a water-activated power bank structure, according to an embodiment of the present disclosure. Please note that the components shown in FIG. 5 are not drawn to scale and are solely for illustrative purposes. As shown in FIG. 5, the bottle body 40 of the water-activated power bank structure 1 is filled with water. The first electrode structure 60 is completely soaked in water. This design ensures that the entire first electrode structure 60 can be used for power generation, thereby increasing the life of the water-activated power bank structure.

Electrolytes such as sodium chloride (NaCl) can be put into the first electrode structure 60 when the water-activated power bank structure 1 is manufactured. In this sense, a user can simply pour water into the bottle body 40 to active the water-activated power bank structure 1. The NaCl dissolved in the water ensures a good reaction between the first electrode structure 60 and the second electrode structure 80.

Although specific embodiments of the present disclosure have been disclosed herein, it is not intended that the present disclosure be limited to the disclosed embodiments. Those skilled in the art would recognize that modifications and variations can be made to these embodiments without departing from the spirit of the present disclosure. It is intended that the present disclosure encompass all such modifications and variations that fall within the scope of the appended claims.

What is claimed is:

1. A water-activated power bank structure, comprising:
   a bottle body with a top opening and a bottom opening, wherein the bottle body is configured to accommodate a first electrode structure and a second electrode structure;
   a top cap configured to mate with the top opening of the bottle body;
   a first bottom cap configured to mate with the bottom opening of the bottle body;
   a second bottom cap configured to mate with the first bottom cap; and
   a power output module disposed in the second bottom cap;
   wherein the first electrode structure has a cylindrical shape and the second electrode structure has a mesh shape,
   wherein the power output module is electrically connected to the first electrode structure and the second electrode structure, and wherein the top cap comprises a first silicon slice, a second silicon slice and an air vent disposed on the top of the top cap.

2. The water-activated power bank structure of claim 1, wherein:
an opening is formed in the center of the first silicon slice and a cut is formed in the center of the second silicon slice, and
wherein the thickness of the first silicon slice is greater than the thickness of the second silicon slice.

3. The water-activated power bank structure of claim 2, wherein the opening and the cut are configured such that gas, but not liquid, can pass through the cut.

4. The water-activated power bank structure of claim 1, wherein the first electrode structure comprises magnesium (Mg), and the second electrode structure comprises carbon (C), nickel (Ni) and an electrically conductive mesh.

5. The water-activated power bank structure of claim 4, wherein the second electrode structure further comprises at least one of the following materials: polytetrafluoroethylene (PTFE), super-conductive carbon black and graphite.

6. The water-activated power bank structure of claim 1, further comprising:
a first conductive component disposed on the inner sidewall of the bottle body;
a second conductive component disposed on both the inner sidewall and the outer sidewall of the first bottom cap; and
a third conductive component disposed on the inner sidewall of the second bottom cap;
wherein the first conductive component is in contact with the second conductive component when the first bottom cap mates with the bottom opening of the bottle body; and
wherein the second conductive component is in contact with the third conductive component when the second bottom cap mates with the first bottom cap.

7. The water-activated power bank structure of claim 6, wherein the power output module is electrically connected to the second electrode structure via the first conductive component, the second conductive component and the third conductive component.

8. The water-activated power bank structure of claim 7, wherein each of the first conductive component, the second conductive component and the third conductive component is a thin metal plate.

9. The water-activated power bank structure of claim 7, wherein each of the first conductive component, the second conductive component and the third conductive component is a conductive coating disposed using a plating process.

10. The water-activated power bank structure of claim 1, further comprising:
a mounting plate having a silicon O-ring, an ACRYLONITRILE-BUTADIENE-STYRENE (ABS) resin and a conductive plate, wherein the mounting plate is fixed to the first electrode structure via a fixing component.

11. The water-activated power bank structure of claim 10, wherein the silicon O-ring is configured to prevent liquid from leaking out from the bottom opening of the bottle body; and
wherein the fixing component is made of conductive materials and is processed to be rust resistant.

12. The water-activated power bank structure of claim 10, wherein:
the first bottom cap comprises an opening formed in the center of the first bottom cap; and
the second bottom cap comprises a base disposed at the bottom of the second bottom cap and a cavity formed in the center of the second bottom cap above the base.

13. The water-activated power bank structure of claim 12, further comprising:
a retractable component disposed in the cavity, wherein the retractable component is made of conductive materials, and wherein the retractable component is in contact with the base, the conductive plate and/or the fixing component when the first bottom cap mates with the bottom opening of the bottle body and when the second bottom cap mates with the first bottom cap.

14. The water-activated power bank structure of claim 13, further comprising a connection component electrically connected between the base and the power output module, wherein the power output module is electrically connected to the first electrode structure via the connection component, the base, the retractable component, the conductive plate and/or the fixing component.

15. The water-activated power bank structure of claim 1, wherein:
the shape of the second electrode structure is flexible; and
the second electrode structure extends for at least a portion of the inner sidewall of the bottle body.

16. The water-activated power bank structure of claim 1, wherein:
the bottle body is filled with water from the top opening of the bottle body.

17. A water-activated power bank structure, comprising:
a bottle body with a top opening and a bottom opening, wherein the bottle body is configured to accommodate a first electrode structure and a second electrode structure;
a top cap configured to mate with the top opening of the bottle body;
a first bottom cap configured to mate with the bottom opening of the bottle body;
a second bottom cap configured to mate with the first bottom cap;
a power output module disposed in the second bottom cap;
a first conductive component disposed on the inner sidewall of the bottle body;
a second conductive component disposed on both the inner sidewall and the outer sidewall of the first bottom cap; and
a third conductive component disposed on the inner sidewall of the second bottom cap;
wherein the first electrode structure has a cylindrical shape and the second electrode structure has a mesh shape,
wherein the power output module is electrically connected to the first electrode structure and the second electrode structure,
wherein the first conductive component is in contact with the second conductive component when the first bottom cap mates with the bottom opening of the bottle body; and
wherein the second conductive component is in contact with the third conductive component when the second bottom cap mates with the first bottom cap.

18. The water-activated power bank structure of claim 17, wherein the power output module is electrically connected to the second electrode structure via the first conductive component, the second conductive component and the third conductive component.

19. The water-activated power bank structure of claim 18, wherein each of the first conductive component, the second conductive component and the third conductive component is a thin metal plate.

20. The water-activated power bank structure of claim 18, wherein each of the first conductive component, the second conductive component and the third conductive component is a conductive coating disposed using a plating process.

* * * * *